(12) United States Patent
Purnhagen et al.

(10) Patent No.: US 9,191,045 B2
(45) Date of Patent: Nov. 17, 2015

(54) PREDICTION-BASED FM STEREO RADIO NOISE REDUCTION

(71) Applicant: DOLBY INTERNATIONAL AB, Amsterdam Zuidoost (NL)

(72) Inventors: Heiko Purnhagen, Sundbyberg (SE); Leif Sehlstrom, Järfälla (SE); Jonas Engdegard, Stockholm (SE)

(73) Assignee: Dolby International AB, Amsterdam (NL)

( * ) Notice: Subject to any disclaimer, the term of this patent is extended or adjusted under 35 U.S.C. 154(b) by 0 days.

(21) Appl. No.: 14/348,019

(22) PCT Filed: Oct. 1, 2012

(86) PCT No.: PCT/EP2012/069323
§ 371 (c)(1),
(2) Date: Mar. 27, 2014

(87) PCT Pub. No.: WO2013/045691
PCT Pub. Date: Apr. 4, 2013

(65) Prior Publication Data
US 2014/0235192 A1 Aug. 21, 2014

Related U.S. Application Data

(60) Provisional application No. 61/540,880, filed on Sep. 29, 2011.

(51) Int. Cl.
*H04B 1/10* (2006.01)
*H04B 1/00* (2006.01)
(Continued)

(52) U.S. Cl.
CPC ............... *H04B 1/10* (2013.01); *G10L 19/005* (2013.01); *G10L 19/008* (2013.01); *G10L 21/0264* (2013.01); *H04B 1/1676* (2013.01); *G10L 21/0224* (2013.01)

(58) Field of Classification Search
CPC ...... H04N 1/10; H04N 1/1676; G10L 19/008; G10L 21/0264; G10L 19/005; G10L 21/0224; H04S 3/002; H04R 5/00
USPC ......... 455/296, 309, 312, 297, 310, 311, 63.1
See application file for complete search history.

(56) References Cited

U.S. PATENT DOCUMENTS 6,539,357 B1 * 3/2003 Sinha .......................... 704/270.1
6,725,027 B1 * 4/2004 Tsuji et al. .................... 455/296
(Continued)

FOREIGN PATENT DOCUMENTS

CN 1650530 8/2005
CN 102201823 9/2011
(Continued)

OTHER PUBLICATIONS

Schuijers Erik et al. "Low Complexity Parametric Stereo Coding" AES Convention 116, May 2004.
(Continued)

*Primary Examiner* — Pablo Tran

(57) ABSTRACT

The present document relates to audio signal processing, in particular to an apparatus and a corresponding method for improving the audio signal of an FM stereo radio receiver. In particular, the present document relates to a method and system for reducing the noise of a received FM stereo radio signal. An apparatus (2) configured to reduce noise of a received multi-channel FM radio signal is described, wherein the received multi-channel FM radio signal is representable as a received mid signal and a received side signal. The apparatus (2) comprises a parameter determination unit (77) configured to determine one or more parameters indicative of a correlation and/or decorrelation between the received mid signal and the received side signal; and a noise reduction unit (79) configured to generate a noise-reduced side signal from the received mid signal and not from the received side signal using the one or more parameters.

32 Claims, 3 Drawing Sheets

(51) Int. Cl.
*H04B 17/00* (2015.01)
*G10L 19/008* (2013.01)
*H04B 1/16* (2006.01)
*G10L 21/0264* (2013.01)
*G10L 19/005* (2013.01)
*G10L 21/0224* (2013.01)

(56) References Cited

U.S. PATENT DOCUMENTS

| | | | |
|---|---|---|---|
| 7,391,870 B2* | 6/2008 | Herre et al. | 381/23 |
| 7,751,572 B2* | 7/2010 | Villemoes et al. | 381/23 |
| 8,929,558 B2* | 1/2015 | Engdegard et al. | 381/17 |
| 2005/0182996 A1* | 8/2005 | Bruhn | 714/752 |
| 2009/0164223 A1* | 6/2009 | Fejzo | 704/500 |
| 2012/0002818 A1* | 1/2012 | Heiko et al. | 381/22 |
| 2013/0142339 A1 | 6/2013 | Purnhagen | |
| 2013/0142340 A1 | 6/2013 | Sehlstrom | |
| 2014/0192987 A1* | 7/2014 | Van Dongen | 381/23 |

FOREIGN PATENT DOCUMENTS

| | | |
|---|---|---|
| JP | H04-506141 | 10/1992 |
| JP | 2011-029570 | 2/2011 |
| JP | 5255702 | 3/2012 |
| WO | 90/16136 | 12/1990 |
| WO | 2010/140105 | 12/2010 |
| WO | 2011/029570 | 3/2011 |
| WO | 2013/045691 | 4/2013 |

OTHER PUBLICATIONS

Purnhagen, Heiko "Low Complexity Parametric Stereo Coding in MPEG-4" Proc. Digital Audio Effects Workkshop, pp. 163-168, Naples, IT, Oct. 2004.

* cited by examiner

Conditions:
A: $E_S >$ ref_high
B: ref_low $< E_S <$ ref_high
C: $E_S <$ ref_low

States:
1: Stereo
2: Authentic mono (previously stereo)
3: Authentic mono (previously mono or intermediate)
4: Forced Mono: ConcealFirst
5: Forced Mono: Conceal ent document relates to audio signal processing, in particular to an apparatus and a corresponding method for improving the audio signal of an FM stereo radio receiver. In particular, the present document relates to a method and system for reducing the noise of a received FM stereo radio signal.

PREDICTION-BASED FM STEREO RADIO NOISE REDUCTION

TECHNICAL FIELD

The present document relates to audio signal processing, in particular to an apparatus and a corresponding method for improving the audio signal of an FM stereo radio receiver. In particular, the present document relates to a method and system for reducing the noise of a received FM stereo radio signal.

BACKGROUND

In an analog FM (frequency modulation) stereo radio system, the left channel (L) and right channel (R) of the audio signal are conveyed in a mid-side (M/S) representation, i.e. as mid channel (M) and side channel (S). The mid channel M corresponds to a sum signal of L and R, e.g. M=(L+R)/2, and the side channel S corresponds to a difference signal of L and R, e.g. S=(L−R)/2. For transmission, the side channel S is modulated onto a 38 kHz suppressed carrier and added to the baseband mid signal M to form a backwards-compatible stereo multiplex signal. This multiplex baseband signal is then used to modulate the HF (high frequency) carrier of the FM transmitter, typically operating in the range between 87.5 to 108 MHz.

When reception quality decreases (i.e. the signal-to-noise ratio over the radio channel decreases), the S channel typically suffers more during transmission than the M channel. In many FM receiver implementations, the S channel is muted when the reception conditions gets too noisy. This means that the receiver falls back from stereo to mono in case of a poor HF radio signal (typically referred to as a mono dropout).

Even in case the mid signal M is of acceptable quality, the side signal S may be noisy and thus can severely degrade the overall audio quality when being mixed in the left and right channels of the output signal (which are derived e.g. according to L=M+S and R=M−S). When a side signal S has only poor to intermediate quality, there are two options: either the receiver chooses accepting the noise associated with the side signal S and outputs a real stereo signal comprising a noisy left and right signal, or the receiver drops the side signal S and falls back to mono.

Parametric Stereo (PS) coding is a technique from the field of very low bitrate audio coding. PS allows encoding a 2-channel stereo audio signal as a mono downmix signal in combination with additional PS side information, i.e. the PS parameters. The mono downmix signal is obtained as a combination of both channels of the stereo signal. The PS parameters enable the PS decoder to reconstruct a stereo signal from the mono downmix signal and the PS side information. Typically, the PS parameters are time- and frequency-variant, and the PS processing in the PS decoder is typically carried out in a hybrid filterbank domain incorporating a plurality of Quadrature Mirror Filter (QMF) banks.

It has been proposed in WO2011/029570, PCT/EP2011/064077 and PCT/EP2011/064084 to use PS encoding of a received FM stereo signal in order to reduce the noise comprised within the received FM stereo signal. The general principle of the Parametric Stereo (PS) based FM stereo radio noise reduction technology is to use parametric stereo parameters derived from the received FM stereo signal, in order to reduce the noise comprised in the received left and right signals. The disclosure of the above mentioned patent documents is incorporated by reference.

SUMMARY

In the present document, a method and system for FM stereo radio noise reduction using a prediction-based framework is described. This prediction-based framework is an alternative approach to the Parametric Stereo (PS) based framework indicated above. As will be described in the present document, the prediction-based framework provides lower computational complexity. Furthermore, it has been observed that at the same time a prediction-based FM stereo radio noise reduction scheme achieves an improved audio quality compared to a PS-based FM stereo radio noise reduction scheme.

According to an aspect an apparatus or system configured to reduce noise of a received multi-channel FM radio signal is described. The multi-channel FM radio signal may be a two channel stereo signal. In particular, the received multi-channel FM radio signal may be representable as or presentable as or indicative of a mid signal and a side signal. Furthermore, the side signal may be indicative of a difference between a left signal and a right signal of a stereo signal.

In an embodiment, the apparatus comprises a parameter determination unit configured to determine one or more parameters indicative of a correlation and/or decorrelation between the received mid signal and the received side signal. The one or more parameters may be a prediction parameter a used to determine a correlated component of a noise-reduced side signal from the received mid signal and/or a decorrelation parameter b used to determine a decorrelated component of the noise-reduced side signal from a decorrelated version of the mid signal. Furthermore, the apparatus comprises a noise reduction unit configured to generate the noise-reduced side signal from the received mid signal using the one or more parameters. For this purpose, the noise reduction unit does not take into account the received side signal, e.g. the samples of the received side signal. In other words, the received side signal is not in the signal path for the determination of the noise-reduced side signal. In particular, the noise reduction unit may be configured to determine the noise-reduced side signal only from the received mid signal (e.g. the samples of the received mid signal) and the one or more parameters.

As indicated above, the parameter determination unit may be configured to determine a prediction parameter a. The prediction parameter a may be indicative of a cross-correlation between the received mid signal and the received side signal. In particular, the parameter determination unit may be configured to determine the prediction parameter a based on an expectation value of a product of corresponding samples of the received mid signal and the received side signal. Even more particularly, the parameter determination unit may be configured to determine the prediction parameter a using the formula $a=E[S*M]/E[M*M]$, wherein $E[\bullet]$ denotes the expectation operator, S denotes the received side signal and M denotes the received mid signal.

In the case that the parameter determination unit provides a prediction parameter a, the noise reduction unit may be configured to generate the noise-reduced side signal (or a correlated component of the noise-reduced side signal) from the received mid signal using the prediction parameter a. The correlated component of the noise-reduced side signal may be determined as the product of the prediction parameter a and the received mid signal, i.e. $a*M$. This means that the correlated component of the noise-reduced side signal may be a weighted version of the received mid signal. In view of the fact that the prediction parameter a may be time variant and/or frequency variant, the weighting factor to the received mid signal may be time variant and/or frequency variant.

The parameter determination unit may be configured to determine a decorrelation parameter b indicative of a decorrelation between the received mid signal and the received side signal. In particular, the parameter determination unit may be configured to determine the decorrelation parameter b based on the energy of a difference signal of the received side signal and a signal determined from the mid signal using the prediction parameter a. Even more particularly, the parameter determination unit may be configured to determine the decorrelation parameter b using the formula $b=\sqrt{E[D*D]/E[M*M]}$ with $D=S-a*M$ being the difference signal. The operator "sqrt( )" indicates the square root operation.

In this case, the noise reduction unit may be configured to generate the noise-reduced side signal (or a decorrelated component of the noise-reduced side signal) from a decorrelated version of the received mid signal using the decorrelation parameter b. In particular, the decorrelated component of the noise-reduced side signal may be determined as b*decorr(M), with decorr(M) being the decorrelated version of the received mid signal. The decorrelated version of the received mid signal may be determined by filtering the received mid signal using an all-pass filter.

If the received side signal comprises a significant amount of noise, it may be beneficial to reduce the impact of the decorrelated component of the noise-reduced side signal on the noise-reduced side signal. For this purpose, the parameter determination unit may be configured to determine an impact factor characteristic of (or indicative of) the spectral flatness of the received side signal. A high spectral flatness typically indicates a high degree of noise comprised within the side signal. As such, the decorrelation parameter b may be dependent on the impact factor. In particular, the decorrelation parameter b may decrease as the impact factor indicates an increasing degree of spectral flatness of the received side signal. By way of example, the impact factor is the SMF_impact_factor described in the present document and a modified decorrelation parameter b_new is determined as b_new=(1−SMF_impact_factor)*b, thereby forcing the decorrelation component of the noise-reduced side signal (i.e. b_new*decorr(M)) to zero, if the SMF-impact_factor tends towards "1".

As indicated above, the parameter determination unit may be configured to determine the one or more parameters (e.g. the prediction parameter a and/or the decorrelation parameter b) in a time variant manner. As such, for each of the one or more parameters, a sequence of the respective parameter for a corresponding sequence of time intervals may be determined. By way of example, for a first parameter (e.g. the prediction parameter a or the decorrelation parameter b) a sequence of first parameters for the sequence of time intervals is determined. The sequence of time intervals may be a sequence of signal frames (comprising e.g. 2048 signal samples). Typically, a particular first parameter of the sequence of first parameters for a particular time interval of the sequence of time intervals is determined using samples of the received mid signal and/or the received side signal which lie within the particular time interval. In cases, where the one or more parameters are time variant, the noise reduction unit may be configured to generate the noise-reduced side signal using the one or more time variant parameters.

In order to ensure continuity between adjacent time intervals and in order to avoid audible discontinuities at the borders of adjacent time intervals, it may be beneficial to determine a sequence of interpolated first parameters by interpolating adjacent first parameters from the sequence of first parameters.

In case of highly deteriorated reception conditions, FM receivers may force received FM radio signals to mono, i.e. the FM receivers may suppress the received side signal. The apparatus may be configured to detect such mono dropout, i.e. the apparatus may be configured to detect that the received multi-channel FM radio signal is a forced mono signal. This may be achieved by detecting a fast transition of the received side signal from high energy to low energy. In particular, an energy of the received side signal within a first time interval of the sequence of time intervals may be determined, and it may be determined that this energy is above a high threshold. Furthermore, a transition period of a number of following successive time intervals during which the energy of the side signal drops from a value above the high threshold to a value below a low threshold may be determined. Based on this information, it may be determined that the received multi-channel FM radio signal following the first time interval is a forced mono signal if the number of successive time intervals of the transition period is below an interval threshold. This interval threshold may be 1, 2, 3 or 4 time intervals following the first time interval.

If it is detected that the received multi-channel FM radio signal in the time interval (directly) following the first time interval is a forced mono signal, the parameter determination unit may be configured to determine the one or more parameters for the time interval (directly) following the first time interval from the one or more parameters for the first time interval. In other words, the parameter determination unit may be configured to conceal the lack of parameters during a mono dropout by using the one or more parameters determined prior to the mono dropout.

As described above, the parameter determination unit may be configured to determine the one or more parameters (e.g. the prediction parameter a and/or the decorrelation parameter b) in a frequency variant manner. This means that different parameters are determined for different subbands of the received mid and/or side signal. For this purpose, the apparatus may comprise a mid transform unit configured to generate a plurality of mid subband signals covering a corresponding plurality of frequency ranges from the received mid signal. Furthermore, the apparatus may comprise a side transform unit configured to generate a plurality of side subband signals covering the corresponding plurality of frequency ranges from the received side signal. In such cases, the parameter determination unit may be configured to determine the one or more parameters for each of the plurality of frequency ranges. In particular, for a second of the one or more parameters (e.g. the prediction parameter a and/or the decorrelation parameter b), a plurality of second subband parameters may be determined from the corresponding plurality of mid subband signals and the corresponding plurality of side subband signals. This may be done by applying the above mentioned formulas for determining the one or more parameters (e.g. the prediction parameter a or the decorrelation parameter b) to each of the plurality of frequency ranges.

The noise reduction unit may be configured to generate the noise-reduced side signal using the one or more frequency variant parameters. In particular, the noise reduction unit may be configured to generate a plurality of noise-reduced side subband signals (only) from the corresponding plurality of mid subband signals and the corresponding plurality of subband parameters. Using an inverse transform unit, the noise-reduced side signal may be generated from the plurality of noise-reduced side subband signals.

The mid transform unit and/or the side transform unit may be QMF filter banks and the inverse transform unit may be an inverse QMF filter bank. In view of the fact that the received mid signal is in the signal path (and the received side signal is not in the signal path), the side transform unit may meet lower requirements than the mid transform unit with regards to at least one of: frequency selectivity; frequency resolution; time resolution; and numerical accuracy.

The received FM radio signal may be dominated by a noisy received side signal which has a higher energy level than the received mid signal. Such situations may lead to perceptually annoying artifacts when generating the noise-reduced side signal from the received mid signal using the one or more parameters. In order to cope with such situations, the parameter determination unit may be configured to limit the one or more parameters by applying to the one or more parameters a limitation factor c. In particular, the one or more parameters may be divided by the limitation factor c. In an embodiment, for c>1, the limitation factor c is proportional to the sum of the one or more squared parameters. In another embodiment, for c>1, the limitation factor c is proportional to the square root of the sum of the one or more squared parameters. Typically, the limitation factor c is selected such that the application of the limitation factor c does not increase the one or more parameters.

It should be noted that the apparatus may comprise a delay unit configured to delay (a sample of) the received mid signal by an amount of time corresponding to computation time required to generate (a corresponding sample of) the noise-reduced side signal.

In good reception conditions when the received side signal comprises little to no noise, it may be beneficial to use the received side signal for generating a stereo signal. For this purpose, the apparatus may comprise a combining unit configured to determine a modified noise-reduced side signal from the noise-reduced stereo signal and the received side signal using a quality indicator indicative of the quality of the received multi-channel FM radio signal. Depending on the quality of the received side signal the modified noise-reduced side signal may be blended between (or selected from or interpolated between) the noise-reduced side signal and the received side signal. For this purpose the combining unit may comprise a noise-reduced gain unit configured to weight the noise-reduced side signal using a noise-reduced gain; a bypass gain unit configured to weight the received side signal using a bypass gain; and a merging unit configured to merge (e.g. add) the weighted noise-reduced side signal and the weighted received side signal; wherein the noise-reduced gain and the bypass gain are dependent on the quality indicator. It should be noted that the combining unit may be configured to determine the modified noise-reduced side signal in a frequency selective manner.

The apparatus may comprise a quality determination unit configured to determine the quality indicator which indicates the quality of the received side signal. This may be done by determining a power of the received mid signal, referred to as mid power, and a power of the received side signal, referred to as side power. A ratio of the mid power and the side power, i.e. a mid-to-side ratio may be determined and the quality indicator of the received FM radio signal may be determined based on at least the mid-to-side ratio. The present document describes various embodiments for determining a quality indicator $\alpha_{HQ}$ which indicates the quality of the received side signal in a reliable manner.

The apparatus may further comprise an MS-to-LR converter configured to determined a noise-reduced left signal and a noise-reduced right signal from the received mid signal and the noise-reduced side signal (or the modified noise-reduced side signal). In particular, the MS-to-LR converter may be configured to determine the noise-reduced left signal from the sum of the received mid signal and the (modified) noise-reduced side signal; and the noise-reduced right signal from the difference of the received mid signal and the (modified) noise-reduced side signal.

According to another aspect, a method for reducing noise of a received multi-channel FM radio signal is described. The received multi-channel FM radio signal may be presentable as a received mid signal and a received side signal. The method may comprise determining one or more parameters indicative of a correlation and/or decorrelation between the received mid signal and the received side signal; and generating a noise-reduced side signal from the received mid signal and not from the received side signal and using the one or more parameters.

According to a further aspect, a software program is described. The software program may be adapted for execution on a processor and for performing the method steps outlined in the present document when carried out on a computing device.

According to another aspect, a storage medium is described. The storage medium may comprise a software program adapted for execution on a processor and for performing the method steps outlined in the present document when carried out on a computing device.

According to a further aspect, a computer program product is described. The computer program may comprise executable instructions for performing the method steps outlined in the present document when executed on a computer.

It should be noted that the methods and systems including their preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner.

DESCRIPTION OF DRAWINGS

The invention is explained below by way of illustrative examples with reference to the accompanying drawings, wherein.

DETAILED DESCRIPTION

Figure 1:
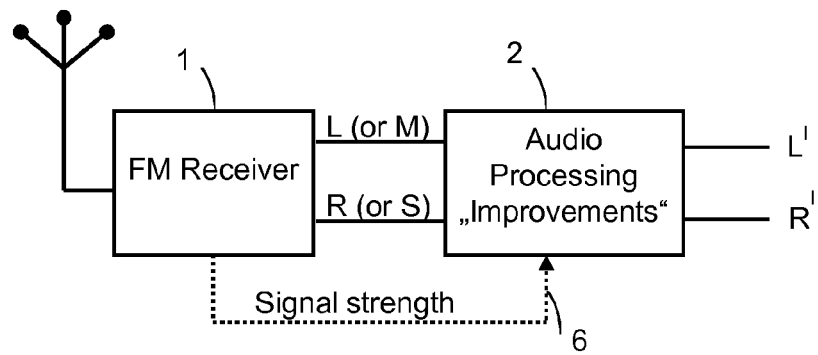
FIG. 1 illustrates a schematic example for a system for improving the stereo output of an FM stereo radio receiver.

FIG. 1 shows a schematic example system for improving the stereo output of an FM stereo radio receiver 1. As discussed in the background section of this document, in FM radio the stereo signal is transmitted by design as a mid signal M and side signal S. In the FM receiver 1, the side signal is used to create the stereo difference between the left signal L and the right signal R at the output of the FM receiver 1 (at least when reception is good enough and the side signal information is not muted). In other words, the side signal is used to create the left and right audio signals from the mid signal. The left and right signals L, R may be digital or analog signals.

For improving the left and right audio signals L, R of the FM receiver, an audio processing apparatus 2 may be used which generates a stereo audio signal L' and R' at its output. The audio processing apparatus 2 may be enabled to perform noise reduction of a received FM radio signal using parametric stereo. Alternatively, the audio processing apparatus 2 may be enabled to perform noise reduction of a received FM radio signal using a prediction-based parameterization as described in the present document.

The audio processing in the apparatus 2 is preferably performed in the digital domain; thus, in case of an analog interface between the FM receiver 1 and the audio processing apparatus 2, an analog-to-digital converter is used before digital audio processing in the apparatus 2. The FM receiver 1 and the audio processing apparatus 2 may be integrated on the same semiconductor chip or may be part of two semiconductor chips. The FM receiver 1 and the audio processing apparatus 2 can be part of a wireless communication device such as a cellular telephone, a personal digital assistant (PDA) or a smart phone. In this case, the FM receiver 1 may be part of the baseband chip having additional FM radio receiver functionality. In another application, the FM receiver 1 and the audio processing apparatus 2 can be part of a vehicle audio system in order to compensate for varying reception conditions of a moving vehicle.

Instead of using a left/right representation at the output of the FM receiver 1 and the input of the apparatus 2, a mid/side representation may be used at the interface between the FM receiver 1 and the apparatus 2 (see M, S in FIG. 1 for the mid/side representation and L, R for the left/right representation). Such a mid/side representation at the interface between the FM receiver 1 and the apparatus 2 may result in a reduced processing load since the FM receiver 1 already receives a mid/side signal and the audio processing apparatus 2 may directly process the mid/side signal without downmixing or without L/R-to-M/S conversion. The mid/side representation may be advantageous if the FM receiver 1 is tightly integrated with the audio processing apparatus 2, in particular if the FM receiver 1 and the audio processing apparatus 2 are integrated on the same device, e.g. the same semiconductor chip.

Optionally, a radio signal strength signal 6 indicating the radio reception condition may be used for adapting the audio processing in the audio processing apparatus 2.

The combination of the FM radio receiver 1 and the audio processing apparatus 2 corresponds to an FM radio receiver having an integrated noise reduction system.

Figure 2:
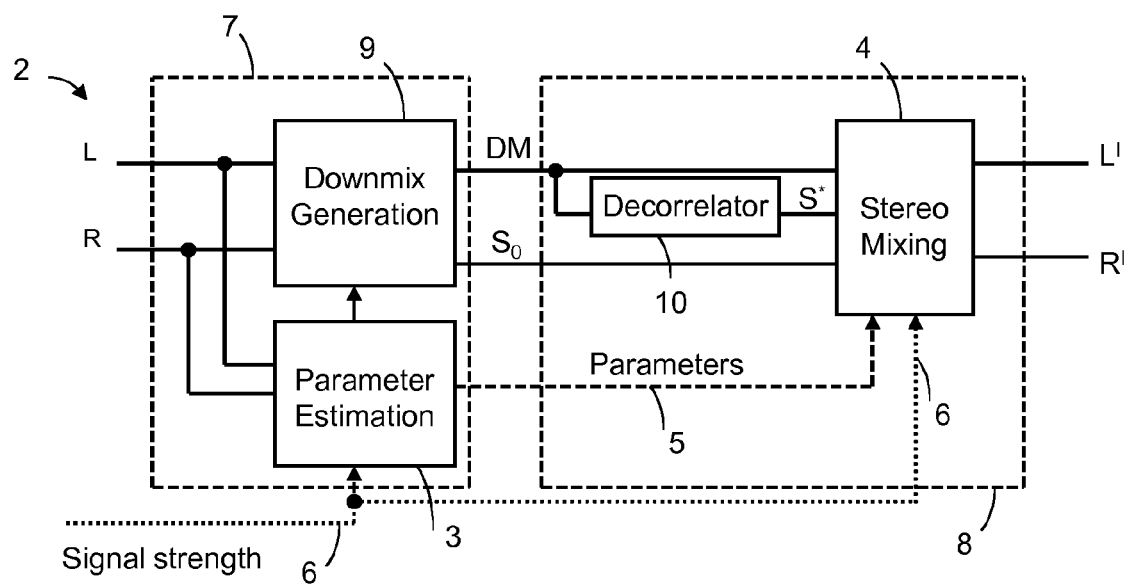
FIG. 2 illustrates an example of an audio processing apparatus based on the concept of parametric stereo.

FIG. 2 shows an embodiment of the audio processing apparatus 2 which is based on the concept of parametric stereo. The apparatus 2 comprises a PS parameter estimation unit 3. The parameter estimation unit 3 is configured to determine PS parameters 5 based on the input audio signal to be improved (which may be either in left/right or mid/side representation). The PS parameters 5 may include, amongst others, a parameter indicating inter-channel intensity differences (IID or also called CLD—channel level differences) and/or a parameter indicating an inter-channel cross-correlation (ICC). Preferably, the PS parameters 5 are time- and frequency-variant. In case of an M/S representation at the input of the parameter estimation unit 3, the parameter estimation unit 3 may nevertheless determine PS parameters 5 which relate to the L/R channels, by applying the appropriate conversion of the L/R channels.

A downmix audio signal DM is obtained from the input signal. In case the input audio signal uses already a mid/side representation, the downmix audio signal DM may directly correspond to the mid signal. In case the input audio signal has a left/right representation, the audio signal may be generated by downmixing the audio signal in a downmix generation unit 9. Preferably, the resulting signal DM after downmix corresponds to the mid signal M and may be generated by the following equation:

$$DM=(L+R)/d, \text{ e.g. with } d=2,$$

i.e. the downmix signal DM corresponds to the average of the L and R signals. For different values of the scaling factor d, the average of the L and R signals is amplified or attenuated. The downmix generation unit 9 and the parameter estimation unit 3 are part of a PS encoder 7.

The apparatus further comprises an upmix unit 4 also called stereo mixing module or stereo upmixer. The upmix unit 4 is configured to generated a stereo signal L', R' based on the audio signal DM and the PS parameters 5. Preferably, the upmix unit 4 does not only use the DM signal but also uses the side signal $S_o$ (which typically corresponds to the originally received side signal S) or a pseudo side signal S* generated from the downmix signal DM using a decorrelator 10. The decorrelator 10 receives the mono downmix DM and generates a decorrelated signal S* which is used as a pseudo side signal. The decorrelator 10 may be realized by an appropriate all-pass filter as discussed in section 4 of the document "Low Complexity Parametric Stereo Coding in MPEG-4", Heiko Purnhagen, Proc. Digital Audio Effects Workshop (DAFx), pp. 163-168, Naples, IT, October 2004. Its discussion of parametric stereo, in particular with regards to the determination of parametric stereo parameters and in particular section 4, is hereby incorporated by reference. The stereo mixing matrix 4 may be a 2×2 upmix matrix which generates the stereo signal L', R' from the signals DM and $S_o$ or S*. The upmix unit 4 and the decorrelator 10 are part of a PS decoder 8.

The apparatus 2 is based on the idea that the received side signal may be too noisy for reconstructing the stereo signal by simply combining the received mid and side signals; nevertheless, in this case the received side signal or the side signal's component in the received L/R signal may be still good enough for stereo parameter analysis in the PS parameter estimation unit 3. The resulting PS parameters 5 can be then used for generating a stereo signal L', R' having a reduced level of noise in comparison to the audio signal directly at the output of the FM receiver 1.

Thus, a noisy FM radio signal can be "cleaned-up" by using the parametric stereo concept. The major part of the distortion and noise in an FM radio signal is located in the side channel which is typically not used in the PS downmix. Nevertheless, the received side channel S is, even in case of noisy reception, often of sufficient quality for PS parameter extraction.

In the drawings shown in the present document, the input signal to the audio processing apparatus 2 is a left/right stereo signal. With minor modifications to some modules within the audio processing apparatus 2, the audio processing apparatus 2 can also process an input signal in mid/side representation. Therefore, the concepts discussed herein can be used as well in connection with an input signal in mid/side representation.

The PS-based FM stereo noise reduction method illustrated in FIG. 2 performs well for situations where the side signal of the received FM radio signal contains high or intermediate levels of noise originating from the radio transmission channel. However, the PS-based FM stereo noise reduction method has several shortcomings. The PS-based FM stereo noise reduction method is rather computational complex, as it requires two QMF analysis banks (for the calculation of the PS parameters) and two QMF synthesis banks (for the generation of the noise-reduced stereo signal L', R'). Furthermore, the PS-based FM stereo noise reduction method typically utilizes a hybrid, i.e. QMF plus an additional Nyquist, filter bank approach for increased frequency resolution at lower frequencies. This means that the determination of the PS parameters typically requires a high amount of filter bank operations. In addition, the PS-based noise reduction method requires transcendental computations, such as sin( ) and a tan( ) operations which involve high computational complexity. Another shortcoming of the PS-based FM stereo noise reduction method is that it is not fully mono compatible since it not only modifies the side signal but also the mid signal in order to determine the noise-reduced stereo signal L', R'. In other words, the mono downmix M'=(L'+R')/2 of the output of a PS-based FM stereo noise reduction system is typically different from the original mid signal M. In particular, the mono downmix signal M' is typically attenuated (i.e., of lower level) if the received stereo signal has a wide stereo image (i.e., if the received stereo signal has significantly panned and/or decorrelated signal components). In contrast to this, for the prediction-based FM stereo noise reduction system, the mono downmix of the output is the original mid signal (since only the side signal is modified/processed).

Since the amount of computational complexity of the PS-based FM stereo noise reduction method is a concern in many implementations, this document describes an alternative framework for FM stereo noise reduction that utilizes a prediction-based approach. Compared to the Parametric Stereo (PS)-based framework, the prediction-based framework requires lower computational complexity. In particular, the prediction-based FM stereo noise reduction method uses a reduced number of filter banks and avoids the use of transcendental computations. At the same time it has been shown that improved audio quality can be achieved when using the prediction-based FM stereo noise reduction method.

As outlined above, the PS-based FM radio noise reduction system shown in FIG. 2 requires two QMF analysis filter banks and two QMF synthesis filter banks. All of these filter bank operations are in the signal path and therefore require high precision. The two QMF analysis filter banks operate on the signals L and R at the input of the PS encoder 7, and the two QMF synthesis filter banks generate the signals L' and R' at the output of the PS decoder 8. Furthermore, the PS-based system uses the stereo parameters IID and ICC, and transcendental functions like sin( ) and a tan( ) are required to compute the elements of the stereo upmix matrix 4 from these stereo parameters.

It is proposed to reduce the computational complexity of FM stereo noise reduction system by using a prediction-based framework instead of the downmix/upmix framework of the PS-based system depicted in FIG. 2. By switching to a mid/side signal representation using the LR-to-MS converter 75 and the MS-to-LR converter 76, in combination with a prediction-based approach, it is possible to reduce the number of required QMF banks. The LR-to-MS converter 75 generates the mid signal M=(L+R)/2 and the side signal S=(L−R)/2, and it may be omitted if the mid/side signals from the FM receiver 1 are directly fed into the audio processing apparatus 2 of FIG. 3. The MS-to-LR converter 76 performs the inverse operation to the LR-to-MS converter 75.

Figure 3:
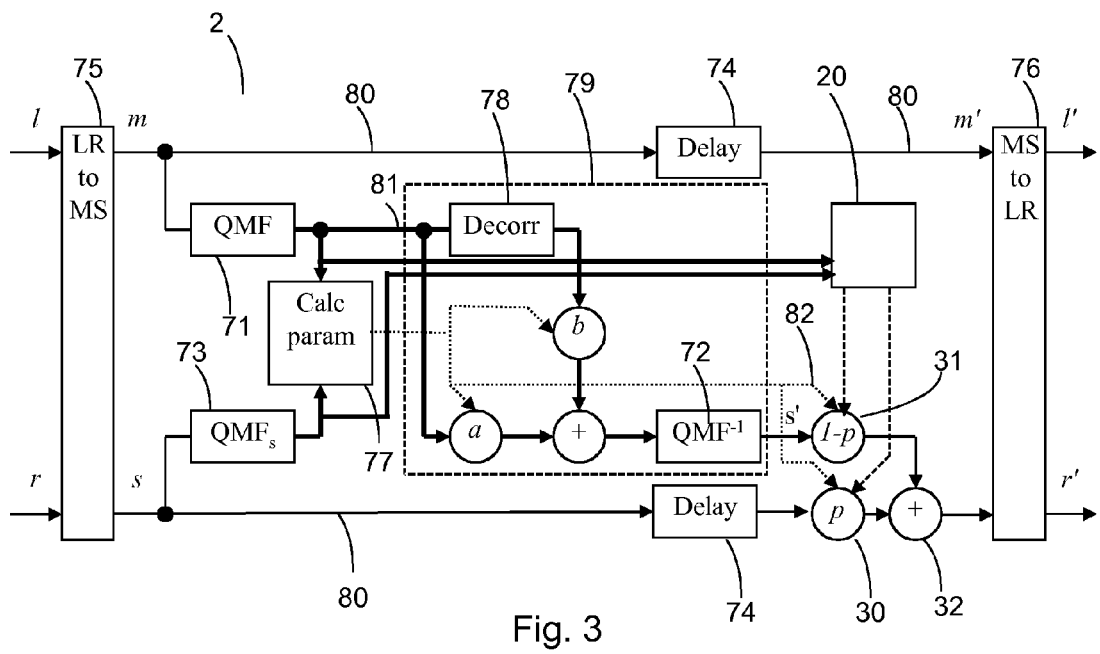
FIG. 3 illustrates an example of an audio processing apparatus based on the concept of prediction.

FIG. 3 shows an overview of an example prediction-based FM radio noise reduction system, where thin lines 80 denote time-domain signals, thick lines 81 denote QMF-domain signals, and dotted lines 82 denote parameters. The prediction-based framework uses only one QMF analysis filter bank 71 and one QMF synthesis filter bank 72 in the signal path, and a second QMF analysis bank 73 which is only used for parameter estimation (and which typically has reduced accuracy requirements).

As outlined above, the PS-based FM radio noise reduction system typically uses a hybrid filter bank (i.e., a combination of a QMF bank with additional band-splitting for the lowest QMF bands using a Nyquist filter bank) in order to achieve a higher frequency resolution for the lowest frequencies up to approximately 1 kHz. For the prediction-based FM radio noise reduction system, it has been found that good audio quality could be achieved even without the additional band-splitting provided by the hybrid filter bank. Hence, the prediction-based FM radio noise reduction system may use only QMF banks (i.e. no hybrid filter banks), which further reduces the computational complexity and also reduces the algorithmic delay (or latency) 74 of the FM radio signal processing.

The prediction-based FM noise reduction system of FIG. 3 aims at generating a noise-reduced side signal S' from the received mid signal M using two parameters a and b. The received mid signal M remains unchanged (apart from a delay 74 used to compensate for the computation time required to determine the noise-reduced side signal S'. This is different from the PS-based FM noise reduction system where two signals, the noise-reduced left and right signals L', R' are determined as a function of the PS parameters.

Defining the received mid and side signals M and S as M=(L+R)/2 and S=(L−R)/2, the side signal can be represented using a prediction coefficient a and a residual signal D as S=a*M+D. This means that the prediction parameter a is used to predict the side signal from the mid signal. An optimal prediction coefficient a (which minimizes the energy of D) can be computed as $$a=E[S*M]/E[M*M],$$

where E[•] denotes the expectation operator. In words, the prediction coefficient a may be determined as the ratio of the cross-correlation between the received side and the received mid signal, and the energy of the mid signal. Typically, the coefficients a (and b) are time and/or frequency variant. This means that different coefficients a (and b) are determined for different time intervals and/or different frequency ranges. As such, the expectation values E[•] may be determined for a specific time interval (e.g. 64 ms) and/or within a specific frequency range (e.g. a QMF subband or a number of grouped QMF subbands).

Once a prediction coefficient has been determined, a residual signal D may be determined from the received mid and side signals M, S. The residual signal D may be approximated by a decorrelated version decorr(M) of the received mid signal M. As such, a noise-reduced version S' of the side signal may be determined as $$S'=a*M+b*\text{decorr}(M)$$

where b is a gain factor controlling the energy of the decorrelated signal, also referred to as the decorrelation parameter b. The decorrelated mid signal decorr(M) may be determined using a decorrelator 78 such as the decorrelator 10 of FIG. 2. The decorrelation parameter b can be computed as $$b=\text{sqrt}(E[D*D]/E[M*M])$$

in order to replace the residual signal D with an energy-controlled decorrelated signal (b*decorr(M)) that has the same energy as the original residual signal D. Consequently, the parameters a, b of the prediction model may be determined from the received mid signal and the received side signal within the parameter determination unit 77.

Consequently, the stereo signal L' and R' at the output of the prediction-based FM noise reduction system is computed from the received mid signal M and the two parameters a and b with a noise reduction unit 79. Since the parameters a and b are typically estimated and applied in a complex-valued QMF domain representation (of e.g. 64 bands), the processing can be carried out in a time- and frequency-varying manner. Typically, a perceptually motivated time and frequency tiling is used. For example, 64 QMF bands may be grouped into a total of 15 frequency bands according to a perceptual frequency scale (e.g. a Bark scale). The perceptual frequency scale may be formed by grouping neighboring QMF bands at higher frequencies to form wider frequency bands which are typically referred to as "parameter bands". The set of parameters a and b (one for each parameter band) are typically calculated in regular time intervals (frames), e.g. using a temporal analysis window of approximately 64 ms length to approximate the E[•] operation. In order to ensure a smooth transition of parameter values from one time interval (e.g. frame) to the next, temporal interpolation (e.g. linear interpolation along the time line) may be employed to yield interpolated parameter values of a and b. The interpolated parameter values a and b are then multiplied with the corresponding QMF band signals to which they are to be applied.

As indicated above, the second QMF analysis bank 73 is only used for the parameter estimation within the parameter determination unit 77. As can be seen from the formulas provided above, the second QMF analysis bank 73 provides subband information on the received side signal S, which is used to determine the cross-correlation E[S*M] on a per parameter band basis. In other words, the second QMF analysis bank 73 is only used to determine expectation values on the level of parameter bands (in contrast to QMF frequency band). In yet other words, the second QMF analysis bank 73 is used to determine the prediction parameter a on a relatively coarse time and frequency grid. Consequently, the requirements on the selectivity (e.g. the length of the prototype windows), the time/frequency resolution and/or the computational accuracy of the second QMF analysis bank 73 are significantly lower than the requirements for QMF analysis banks 71 which lie within the signal path.

As such, an audio processing apparatus 2 has been described which allows the determination of a noise-reduced side signal S' at reduced computational complexity compared to a PS-based FM noise reduction system according to FIG. 2. The side signal S' and the (delayed) received mid signal M' may be converted into a noise-reduced left and right stereo signal L', R' using the MS-to-LR converter 76. Perceptual experiments have shown that in addition to reducing the computational complexity, the perceptual quality of the noise-reduced FM signals can be improved when using the prediction-based FM noise reduction system outlined in the present document (e.g. in FIG. 3).

On the other hand, it has been observed that when using a prediction-based approach for FM stereo noise reduction, situations where the received signal is dominated by a strong and noisy side signal (i.e. having a higher level than the mid signal) can cause perceptually annoying artifacts. Such situations can occur e.g. when the transmitted stereo signal is relatively silent (e.g., during a short pause between two pieces of music) while the receiver is facing intermediate to bad reception conditions. Such situations may be characterized by E[S*S]>>E[M*M], i.e. the energy of the received side signal S is (significantly) higher than the energy of the received mid signal M. In view of the fact that the parameters a and b depend on the energy of the mid signal E[M*M] and partially on the energy of the side signal E[S*S], the parameters a and b typically have large absolute values (clearly greater than one) in the above mentioned situations. This means that the mid signal M is significantly gained up in order to determine the noise-reduced side signal S', thereby introducing artifacts. Furthermore, the parameters a and b may strongly fluctuate along time and frequency, which is typically perceived acoustically as an undesirable instability.

In order mitigate this problem, a post-processing step can be applied to the parameters a and b. In other words, a modified set of parameters a' and b' can be determined with a'=$f_a(a,b)$ and b'=$f_b(a,b)$. A possible post processing approach is to apply an attenuation or limitation factor c to obtain the post-processed parameters a'=a/c and b'=b/c, where c=1 results in unmodified parameters a and b. Values of c>1 cause the noise-reduced side signal S' to be multiplied by 1/c, i.e., to be attenuated by a factor c. It should be noted that other formulas for the relationship between a', b' and a, b are possible.

Different approaches to compute the limitation factor c from a and b, i.e., c=f(a,b), are possible. Two possible approaches are:

$$c=\max(1,(a^2+b^2)), \text{ or} \tag{1}$$

$$c=\max(1,\sqrt{(a^2+b^2)}). \tag{2}$$

The approach using formula (2) ensures that the energy of the noise-reduced side signal S' does not exceed the energy of the mid signal M, while the approach using formula (1) applies an even stronger attenuation to S' (compared to formula (2)) in the situations described above, where E[S*S]>E[M*M]. It has been found that the approach using formula (2) tends to provide slightly better audio quality for wide stereo signals in case of good reception conditions, while the approach using formula (1) tends to be more reliable in preventing the perceptually annoying artifacts described above in case of intermediate and bad reception conditions.

It should be noted that in typical reception situations the energy of the side signal E[S*S] is smaller than the energy of the mid signal E[M*M]. In this case, the parameters a and b are typically smaller than 1. The "max" operation in formulas (1) and (2) ensures that in such situations the limitation factor is c=1, i.e. no limitation is applied.

As illustrated in FIG. 3, a parameter p may be used to smoothly crossfade between a noise-reduced side signal S' and the originally received (delayed) side signal S in a pass-through or bypass mode. The pass-through mode can be beneficial to handle situations with good reception conditions in an optimal way. For this purpose, the quality of the received FM stereo signal should be estimated in a reliable way, in order to decide on the use of S', S or a combination of S' and S for the generation the noise-reduced stereo signal L', R'. In more general terms, the noise-reduced side signal S' may pass through a noise-reduced gain unit 31 and the bypassed side signal S may pass through a bypass gain unit 30. The gain units 30, 31 generate amplified and/or attenuated side signals at their output from the side signals at their input. The amplified and/or attenuated side signals are merged in a merging unit (e.g. an adding unit) 32, thereby providing a combined side signal which is used to generate the noise-reduced stereo signal L', R'.

The prediction-based FM noise reduction system may further comprise an HQ (high quality) detection unit 20 which is configured to determine or to estimate the level of the audible noise within the received FM stereo signal L, R (or M, S). The noise level estimate determined within the HQ detection unit 20 may be used to blend between the noise-reduced side signal S' and the original (bypassed) side signal S. For blending the side signals, the HQ detection unit 20 may be configured to set the gain values of the noise-reduced gain unit 31 and the bypass gain unit 30. Alternatively or in addition, the blending of the side signals may be achieved by interpolating (linearly or non-linearly) the side signals. Alternatively, one of the side signals may be selected based on the estimate of the level of the audible noise determined within the HQ detection unit 20.

In the following, a method is described how the HQ detection unit 20 may estimate the actual level of noise within the received FM stereo signal and to thereby decide whether to put more emphasis on the noise-reduced side signal S' or to put more emphasis on the bypassed side signal S.

In order to discriminate between noise and the actual payload signal, it is assumed that the received side signal S predominantly contains noise if the side signal S is significantly stronger than the received mid signal M. In other words, it is assumed that if the power of the side signal S exceeds the power of the mid signal M by a pre-determined threshold, the power of the side signal S is mainly due to noise. Hence, the Signal-to-Noise Ratio (SNR) of the received stereo signal M, S can be approximated as the Mid-to-Side Ratio (MSR) for low MSR values:

$$SNR(k) \approx MSR = \frac{E\{m_k^2\}}{E\{s_k^2\}}, \text{ if } MSR < \text{MSR\_THRESHOLD}$$

for every frequency band k. The MSR_THRESHOLD may be set to e.g. −6 dB. In other words, if the ratio of the energy $E\{s_k^2\}$ in the frequency band k of the side signal S exceeds the energy $E\{m_k^2\}$ in the frequency band k of the mid signal M by a pre-determined threshold (e.g. +6 dB), the MSR may be considered to be equal to or approximate to the SNR in the frequency band k, thereby providing a reliable estimate of the noise comprised within the received FM stereo signal.

The k=1, ..., K frequency bands can be derived e.g. from a QMF bank analysis stages 71, 73, where K=64 channels of QMF audio data may be used for processing. As outlined above, the QMF or hybrid QMF bands may advantageously be grouped into a reduced number of frequency bands which correspond e.g. to a non-uniform perceptibly motivated scale, e.g. the Bark scale. As such, the MSRs can be determined for a plurality of frequency (parameter) bands, wherein the resolution of the plurality of frequency bands is perceptually motivated. By way of example, a QMF filterbank may comprise 64 QMF bands or a hybrid QMF filterbank may comprise 71 bands. The resolution of these filterbanks is typically overly high in the high frequency range. As such, it may be beneficial to group some of the bands in a perceptually motivated manner. As outlined above, the parameters in the prediction-based FM noise reduction system correspond to such grouped (perceptually motivated) frequency bands. By way of example, the parameters a and b of the prediction-based FM noise reduction system may be determined using a total of 15 to 20 grouped QMF frequency bands within a time window corresponding to a signal frame (comprising e.g. 2048 samples). The same frequency or parameter bands used for determining the parameters a and b, may also be used for determining the MSR values per frequency/parameter bands, thereby reducing the overall computational complexity.

The power of a parameter band k for the mid signal M and for a certain given point in time n can be calculated as the expectation value:

$$E\{m_k^2\} = \frac{1}{N} \sum_{n=n_1}^{n_1+N-1} m_{k,n}^2,$$

where a rectangular window located between time instants or samples $n_1$ and $n_1+N-1$ is used. It should be noted that other window shapes may be used to determine the expectation value. Alternative time/frequency representations (other than QMF) can also be used such as a Discrete Fourier Transform (DFT) or other transforms. Also in that case the frequency coefficients may be grouped into fewer (perceptually motivated) parameter bands.

When the side signal S is not stronger than the mid signal M (or not stronger by the factor MSR_THRESHOLD), an SNR estimate is typically not available using the MSR. In other words, when the side signal S is not stronger than the mid signal M (or not stronger by MSR_THRESHOLD), the MSR is typically not a good estimate of the SNR. In this case, an SNR may be determined based on one or more former estimates of the SNR. This may be implemented by applying a smoothening or decay function as described in the context of step 104 of FIG. 5.

Figure 4:
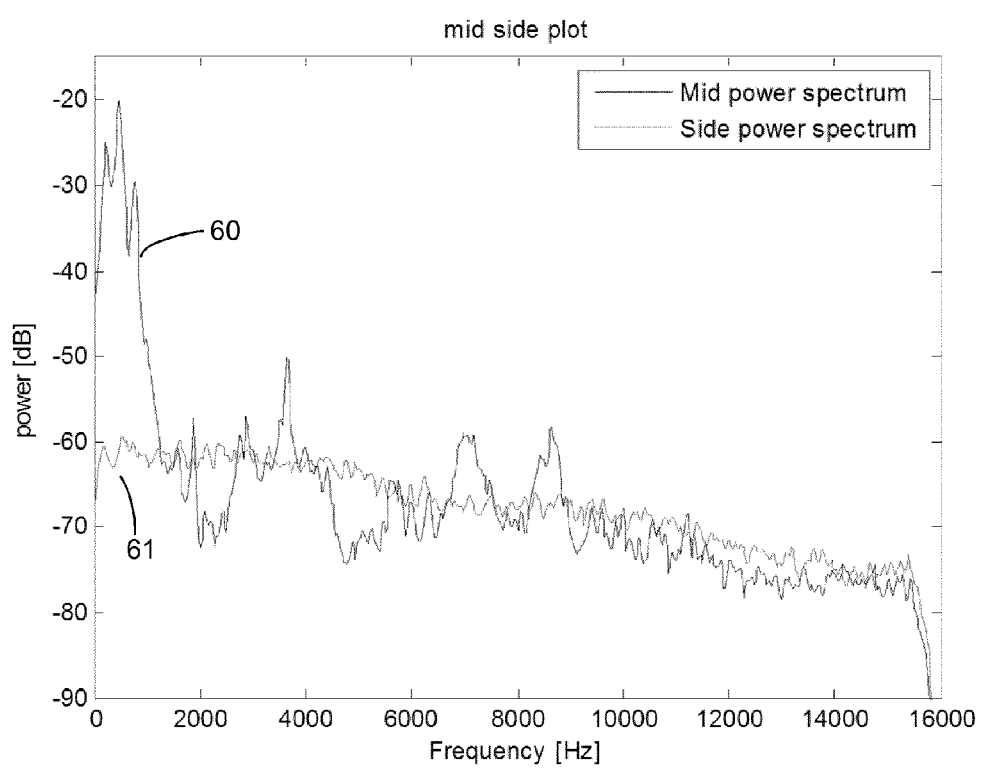
FIG. 4 shows example power spectra for the mid and side signal of a noisy FM radio speech signal.

FIG. 4 shows the power spectrum for a mid signal 60 and the power spectrum for a side signal 61 in a noisy FM radio reception condition. For the frequency bands with a strong dominating mid signal M, it is ambiguous whether the side signal S is noise or not. The side signal S could e.g. be part of an ambience signal or part of a panned signal. Consequently, these frequency bands typically do not provide a reliable indication of the power of the noise within the received FM stereo signal L, R (or M, S). However, looking at the frequency bands where the side signal S is significantly stronger than the mid signal M (e.g. by at least 6 dB or by almost 10 dB), this may be taken as a very likely indication of essentially pure noise within the side signal S caused by the radio transmission. Such a situation, where $E\{s_k^2\} \gg E\{m_k^2\}$, can be seen in FIG. 4 at approx. 2 kHz and 5 kHz. As such, the minimum of the MSRs across the frequency bands k=1, ..., K may be considered to be a reliable indicator of the SNR of the received FM radio signal, i.e. of the quality of the overall received FM radio stereo signal.

Audio content such as music or speech typically has less payload energy in the high frequency range than in the low frequency range. Furthermore, the payload energy in the high frequency range may be less continuous than in the low frequency range. As such, the energy of the noise of a received FM signal may be more easily detected within the high frequency range than in the low frequency range. In view of this, it may be beneficial to limit the analysis of the MSRs to a selected sub-range of the total K frequency bands. In particular, it may be beneficial to limit the analysis of the MSRs to the upper sub-range of the total K frequency bands, e.g. to the upper half of the K frequency bands. As such, the method for detecting the quality of the received FM signal may be made more robust.

In view of the above, a high quality factor $\alpha_{HQ}$ may be defined which depends on an analysis of MSRs across some or all of the frequency bands k=1, ..., K (e.g. across the high frequency bands). The high quality factor $\alpha_{HQ}$ may be used as an indicator of the audible noise within the received FM radio stereo signal. A high quality signal with no noise may be indicated by $\alpha_{HQ}=1$ and a low quality signal with high noise may be indicated by $\alpha_{HQ}=0$. Intermediate quality states may be indicated by $0<\alpha_{HQ}<1$. The high quality factor $\alpha_{HQ}$ can be derived from the MSR values according to:

$$\alpha_{HQ} = \begin{cases} 0, & \text{if } q < \text{MSR\_LOW} \\ 1, & \text{if } q > \text{MSR\_HIGH} \\ \frac{q - \text{MSR\_LOW}}{\text{MSR\_HIGH} - \text{MSR\_LOW}}, & \text{otherwise} \end{cases},$$

where the MSR thresholds MSR_LOW and MSR_HIGH are pre-determined normalization thresholds and can be chosen in an example as −6 dB and −3 dB, respectively. As a result of such normalization, it is ensured that the high quality factor $\alpha_{HQ}$ takes on values between 0 and 1.

In the above formula, q is a value derived from one or more MSR values. As indicated above, q may be derived from the minimum MSR value across a subset of the frequency bands. Furthermore, q could be set as an inverted peak-decay value of the minimum MSR value. Alternatively or in addition, any other smoothing method could be used to smoothen the evolution of the quality indicator parameter q across time.

The high quality factor $\alpha_{HQ}$ can be used for switching or fading or interpolating between the noise-reduced side signal S' and the original unprocessed side signal S. This means that the high quality factor $\alpha_{HQ}=p$ may be used as the gain for the bypass gain unit 30, whereas the factor $(1-\alpha_{HQ})=1-p$ may be used as the gain for the noise-reduced gain unit 31.

Figure 5:
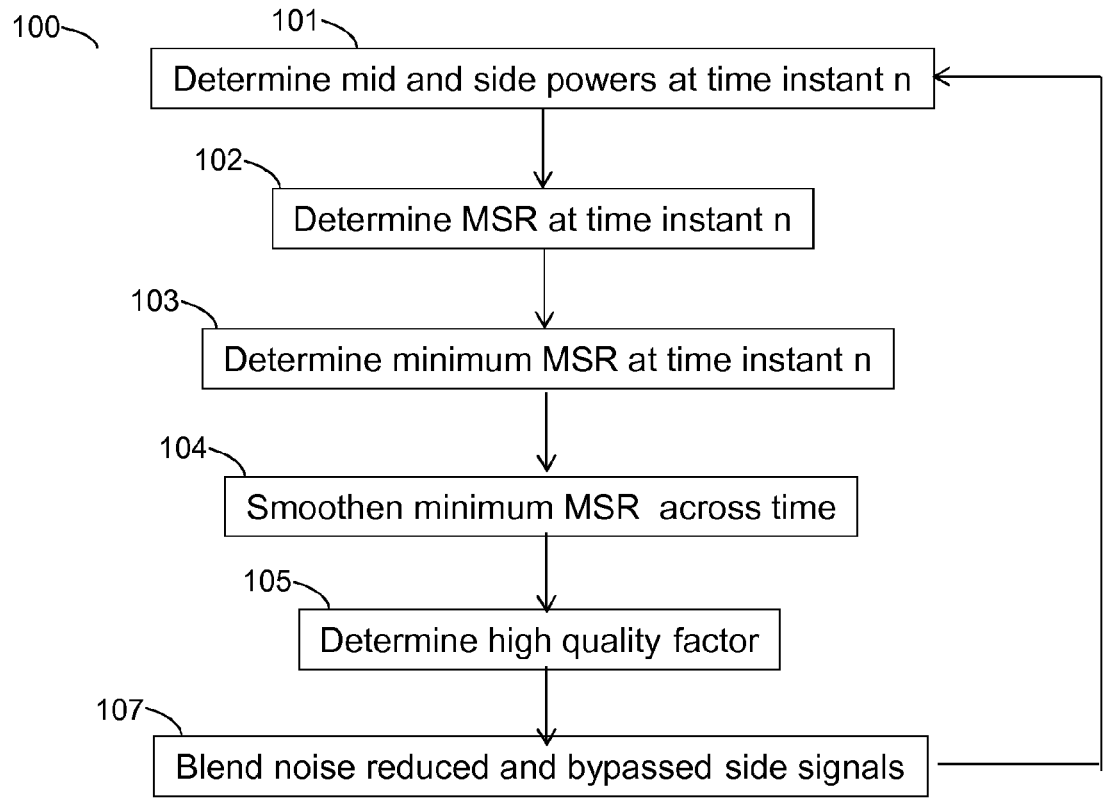
FIG. 5 illustrates an example flow chart of a method for the processing of received FM radio signals using a quality indicator of the received FM radio signals.

An embodiment of an HQ detection algorithm 100 can be described by the following steps shown in FIG. 5:

In a step 101, mid and side signal powers are calculated, i.e. the energy of the mid signal $P_k^M = E\{m_k^2\}$ and the energy of the side signal $P_k^S = E\{s_k^2\}$ are determined for some or all of the frequency or parameter bands k, e.g. $K_{low} < k \le K_{high}$. In an example $K_{high}=K$ and $K_{low}=K/2$ (i.e. only the upper half of the frequency bands is considered). The mid and side powers $P_k^M$ and $P_k^S$ are determined at a time instant n, e.g. using the averaging formula for the expectation value provided above.

In a step 102, the Mid to Side Ratio (MSR) values for the some or all of the frequency bands k is determined, e.g. as, $$\gamma_k = 10 \log_{10}\left(\frac{P_k^M}{P_k^S}\right).$$

In a step 103, the minimum MSR value $$\gamma_{min} = \min_k(\gamma_k)$$

for a certain frequency range is determined, wherein the frequency range is e.g. $K_{low} < k \le K_{high}$.

In a step 104, the minimum MSR values are smoothened across the time, e.g. by determining an MSR peak value as $\gamma_{peak}(n)=\min(\kappa\gamma_{peak}(n-1),\gamma_{min})$, with a decay factor $\kappa=\exp(-1/(F_s\tau))$ with a time constant of e.g. $\tau=2$ seconds and with $F_s$ being the frame rate, i.e. the rate how frequently step 104 is carried out. This implements an inverted peak-decay function which smoothens the minimum MSR values across the time.

In a step 105, the high quality factor $\alpha_{HQ}$ at time instant n is determined by using the MSR peak value $\gamma_{peak}(n)$ at time instant n, i.e. by using the smoothened minimum MSR value at time instant n, with $q=\gamma_{peak}(n)$ as $$\alpha_{HQ} = \begin{cases} 0, & \text{if } q < \text{MSR\_LOW} \\ 1, & \text{if } q > \text{MSR\_HIGH} \\ \frac{q - \text{MSR\_LOW}}{\text{MSR\_HIGH} - \text{MSR\_LOW}}, & \text{otherwise} \end{cases}.$$

As indicated above, the MSR thresholds may be set as e.g. MSR_LOW=−6 dB and MSR_HIGH=−3 dB.

In a step 107, the high quality factor $\alpha_{HQ}$ at time instant n may be applied to the side signal blending process illustrated in FIG. 3.

The above mentioned HQ detection algorithm 100 may be iterated for succeeding time instants (illustrated by the arrow from step 107 back to step 101.

The method or system for determining a high quality of the received FM radio stereo signal may be further improved by making the high quality factor $\alpha_{HQ}$ dependent on one or more further noise indicators (in addition to the one or more MSR values). In particular, the high quality factor $\alpha_{HQ}$ may be made dependent on a Spectral Flatness Measure (SFM) of the received FM radio stereo signal. As outlined in WO PCT/EP2011/064077, a so called SFM_impact_factor which is normalized between 0 and 1 may be determined. A SFM_impact_factor=0 may correspond to a low SFM value indicating a power spectrum of the side signal S for which the spectral power is concentrated in a relatively small number of frequency bands. I.e. a SFM impact factor of "0" indicates a low level of noise. On the other hand, a SFM impact factor of "1" corresponds to a high SFM value indicating that the spectrum has a similar amount of power in all spectral bands. Consequently, an SFM impact factor of "1" indicates a high level of noise.

A modified high quality factor $\alpha'_{HQ}$ may be determined according to:

$$\alpha'_{HQ}=(1-\text{SFM\_impact\_factor})*\alpha_{HQ},$$

thereby emphasizing a high quality factor $\alpha'_{HQ}=0$ (indicating a low quality, i.e. a high degree of noise) if the SFM_impact_factor=1 (indicating a high level of noise within the received FM radio stereo signal) and vice versa. It should be noted that the above mentioned formula for combining the effects of the MSR based high quality factor $\alpha_{HQ}$ and the SFM is only one possible way of combining the two noise indicators to a joint (modified) high quality factor $\alpha'_{HQ}$. The SFM_impact_factor may be beneficial to detect noise cases where both mid and side signals have rather flat spectra and are close in energy. In such cases, the minimum MSR value $\gamma_{min}$ is typically close to 0 dB despite a significant amount of audible noise within the received FM radio stereo signal. The modified high quality factor $\alpha'_{HQ}$ may replace the high quality factor $\alpha_{HQ}$ in the PS processing/bypass blending process described above.

In the following another option for enhancing the methods and systems for HQ detection is described. A modified high quality factor $\alpha'_{HQ}$ may be determined by affecting the high quality factor $\alpha_{HQ}$ by the total side level $S_{sum}$ as a soft noise gate, i.e. the total level (i.e. the energy or power) of the side signal which may be determined as the energy of the side signal (across all frequency bands). As such, the modified high quality factor $\alpha'_{HQ}$ may be determined according to:

$$\alpha'_{HQ} = g_{gate}\alpha_{HQ},$$

where $$g_{gate} = \begin{cases} 0, & \text{if } S_{sum} < \text{S\_THRES\_LOW} \\ 1, & \text{if } S_{sum} > \text{S\_THRES\_HIGH} \\ \dfrac{S_{sum} - \text{S\_THRES\_LOW}}{\text{S\_THRES\_HIGH} - \text{S\_THRES\_LOW}}, & \text{otherwise} \end{cases}$$

The thresholds S_THRES_LOW and S_THRES_HIGH may be used to normalize the gate factor $g_{gate}$ to values between 0 and 1. FM signals with side signals which have a level $S_{sum}$<S_THRES_LOW are considered to be of low quality, whereas FM signals with side signals which have a level $S_{sum}$>S_THRES_HIGH may be of high quality.

Another option for providing an enhanced HQ detection algorithm is to let the high quality factor $\alpha_{HQ}$ be affected by the output of a concealment detector as described e.g. in WO PCT/EP2011/064084. A modified high quality factor $\alpha'_{HQ}$ may be determined by taking into account if concealment is active within the prediction-based FM radio noise reduction system, in order to conceal undesirable mono dropout situations of the FM receiver. The modified high quality factor $\alpha'_{HQ}$ may be determined according to $\alpha'_{HQ}=(1-\delta_{conceal})\alpha_{HQ}$, where $\delta_{conceal}=1$ if concealment is active, and where otherwise $\delta_{conceal}=0$. This means that a received FM radio signal is certainly considered to be of low quality (a'$_{HQ}$=0) if the concealment is active within the prediction-based FM radio noise reduction system, otherwise the quality of the received FM radio signal is estimated based on the calculated value of the high quality factor $\alpha_{HQ}$. In order to avoid (audible) discontinuities when recovering from the concealment state (i.e. $\delta_{conceal}=1$), i.e. in order to ensure a smooth transition of the modified high quality factor $\alpha'_{HQ}$ from 0 to a non-zero value, the minimum MSR value $\gamma_{min}$ may be forced to $\gamma_{min}$=MSR_LOW whenever $\delta_{conceal}=1$, such that the smooth transition is ensured by the smoothing method of step 104 of FIG. 5. As a result of making the high quality factor dependent on the concealment state $\delta_{conceal}$, a fast switching to the mode using prediction-based FM radio noise reduction (i.e., a fast transition to FM radio noise reduction processing for the sudden occurrence of a bad reception condition), and a slow blend back to the bypass mode (when reception conditions have improved) can be implemented.

In the following, another option for enhancing the HQ detection methods is described. The MSR values $\gamma_k$ may be adjusted for largely panned signals, according to:

$$\gamma'_k = \gamma_k + \lambda = 10\log_{10}\left(\frac{P_k^M}{P_k^S}\right) + \lambda.$$

The parameter $\lambda$ indicates a degree of the panning of the received FM radio stereo signal. The parameter $\lambda$ may be determined from the ratio of the energy of the received left side signal L and the received right side signal R, e.g. according to $$\lambda = \left|10\cdot\log_{10}\left(\frac{P^L}{P^R}\right)\right|,$$

with $P^L=E\{L^2\}$ being the energy or power of the received left side signal and $P^R=E\{R^2\}$ being the energy or power of the received right side signal. Consequently, the MSR values $\gamma_k$ are increased for heavily panned signals having a significant energy difference between the left side signal L and the right side signal R. Such a heavy difference between the L and R signals leads to a side signal S having a relatively high energy, even though the side signal S does not comprise noise. By increasing the MSR values $\gamma_k$, the minimum MSR value $\gamma_{min}$ is increased, thereby increasing the high quality factor $\alpha_{HQ}$. Consequently, the use of the parameter $\lambda$ helps to avoid false detection of low quality signals from strong side signals S which are due to wide (music) stereo mixes and stereo widening post-processes.

It should be noted that the above mentioned options for determining a modified high quality factor $\alpha_{HQ}$ can be used standalone or in an arbitrary combination with each other.

Furthermore, it should be noted that the high quality factor $\alpha_{HQ}$ can be used to adjust the parameters a and b in the prediction-based FM stereo radio noise reduction system. In particular, the limitation factor c may be affected by the quality indicator $\alpha_{HQ}$. This can be done e.g. according to:

$$c=\max(1,(a^2+b^2)^{(1-\alpha_{HQ}+\epsilon)}),$$

where $\epsilon$ is an optional adjustment value (small number) preventing a and b from infinity (or unreasonable large numbers) when the quality indicator $\alpha_{HQ}=1$, i.e. when the received FM signal comprises a low degree of noise.

The purpose of a limiting function c=f (a, b, $\alpha_{HQ}$) which depends on the quality indicator $\alpha_{HQ}$, is to limit a and b for a low quality FM signal ($\alpha_{HQ}$ close to zero) while not (or only slightly) limiting a and b for a high quality FM signal ($\alpha_{HQ}$ close to one). It should be noted that the above mentioned function for modifying the limitation factor in dependence of the quality indicator $\alpha_{HQ}$ approximates the first function (1) of c for $\alpha_{HQ}$=0, the second function (2) for $\alpha_{HQ}$=0.5, and "no limiting" of the parameters a and b is performed for $\alpha_{HQ}$=1. Furthermore, it should be noted that the above mentioned formula is only one example of implementing a modified limitation function which takes into account the quality of the received FM signal.

The selection or the merging of the noise-reduced side signal S' and the bypassed side signal S illustrated in FIG. 3 may be performed in a frequency selective manner. A possible implementation would comprise the following modifications to the block diagram of FIG. 3. The block diagram in FIG. 3 could be modified such that the gain units 30, 31 and the merging unit 32 would be performed in the QMF domain prior to the side signal synthesis filter bank "QMF$^{-1}$" 72. Furthermore, the input to the bypass gain unit 30 could be the output of the "QMF$_s$" analysis filter bank 73. This would mean that the filter bank 73 is in the signal path in case of pass-through, and hence has the same accuracy requirements as the "QMF" analysis filter bank 71. The QMF synthesis filter bank 72 could be used to convert the merged side signal (downstream of the merging unit 32) into the time domain.

In an alternative embodiment, the frequency selectivity may be restricted to two frequency bands, i.e. a high frequency band and a low frequency band. In particular, the low frequency band may be fixed to the bypass path, i.e. the reconstructed side signal may correspond to the received side signal S for the low frequency range, whereas in the high frequency range the noise-reduced side signal S' (or a blended side signal in accordance to the quality indicator p) may be used.

WO PCT/EP2011/064077 describes techniques to reduce or remove undesired amounts of de-correlated components in the noise-reduced stereo signal through the use of a spectral flatness measure. These techniques can also be applied to the prediction-based FM radio noise reduction system described in the present document. In particular, the spectral flatness measure can be applied by modifying the parameter b as follows:

b_new=(1−SMF_impact_factor)*b.

This means that a SFM_impact_factor=1 would force b_new=0. For an SFM_impact_factor=0, b would remain unchanged. As such, in case of a side signal with a high spectral flatness (indicative of a noisy side signal) with SFM_impact_factor=1, no decorrelation is added to the noise-reduced side signal S', such that the noise-reduced side signal S' corresponds to a scaled version of the received mid signal, i.e. a*M.

In the following, examples for determining a SFM_impact_factor are outlined. In typical received FM radio stereo signals, the power spectrum of the mid signal M is relatively steep with high levels of energy in the lower frequency range. On the other hand, the side signal S typically has an overall low degree of energy and a relatively flat power spectrum.

Since the power spectrum of the side signal noise is rather flat and has a characteristic slope, the SFM together with slope compensation may be used to estimate the noise level within the received FM signal. Different types of SFM values may be used. I.e. the SFM values may be calculated in various manners. In particular, the instantaneous SFM value, as well as a smoothed version of the SFM may be used. The instantaneous SFM value typically corresponds to the SFM of a signal frame of the side signal, whereas the smoothed version of the instantaneous SFM value also depends on the SFM of previous signal frames of the side signal.

A method for determining an impact factor from the side signal may comprise the step of determining the power spectrum of the side signal. Typically, this is done using a certain number of samples (e.g. the samples of a signal frame) of the side signal. The power spectrum may be determined as the energy values of the side signal $P_k^S = E\{s_k^2\}$ for a plurality of frequency bands k, e.g. k=1, . . . , K. The determination period of the power spectrum may be aligned with the period for determining the parameters a and b. As such, a power spectrum of the side signal may be determined for the validity period of the corresponding parameters a and b.

In a subsequent step, the characteristic slope of the power spectrum of side signal noise may be compensated. The characteristic slope may be determined experimentally (at a design/tuning phase), e.g. by determining the average power spectrum of the side signals of a set of mono signals. Alternatively or in addition, the characteristic slope may be determined adaptively from the current side signal, e.g. using linear regression on the power spectrum of the current side signal. The compensation of the characteristic slope may be performed by an inverse noise slope filter. As a result, a slope compensated, possibly flat, power spectrum should be obtained, which does not exhibit the characteristic slope of the power spectrum of a side signal of a mono speech audio signal.

Using the (slope compensated) power spectrum, an SFM value may be determined. The SFM may be calculated according to $$SFM = \frac{\left(\prod_{k=0}^{N-1} E\{s_k^2\}\right)^{1/N}}{\frac{1}{N}\sum_{k=0}^{N-1} E\{s_k^2\}}$$

wherein $E\{s_k^2\}$ denotes the power of the side signal in frequency or parameter band k. The frequency partitioning used in the prediction-based FM noise reduction system typically comprises 15 to 20 parameter bands. The SFM may be described as the ratio between the geometric mean of the power spectrum and the arithmetic mean of the power spectrum.

Alternatively, the SFM may be calculated on a subset of the spectrum, only including the frequency bands ranging from $K_{low}$ to $K_{high}$. That way e.g. one or a few of the frequency bands can be excluded in order to remove an unwanted DC, e.g. low frequency, offset. When adjusting the band borders the above mentioned formula for calculating the SFM should be amended accordingly.

For reasons of limiting the computational complexity, the SFM formula may alternatively be replaced by numerical approximations of it based on e.g. a Taylor expansion, look-up table, or similar techniques commonly known by experts in the field of software implementations. Furthermore, there are also other methods of measuring spectral flatness, such as e.g. the standard deviation or the difference between minimum and maximum of the frequency power bins, etc. In the present document, the term "SFM" denotes any of these measures.

Using the SFM value for the particular time period or frame of the side signal, an impact factor can be determined. For this purpose, the SFM is mapped, e.g. onto a scale of 0 to 1. The mapping and the determination of an SFM impact factor may be performed according to SFM_impact_factor =
$$\begin{cases} 0, & SFM < \alpha_{low\_thresh} \\ \frac{SFM - \alpha_{low\_thresh}}{\alpha_{high\_thresh} - \alpha_{low\_thresh}}, & \alpha_{low\_thresh} \leq SFM \leq \alpha_{high\_thresh} \\ 1, & SFM > \alpha_{high\_thresh} \end{cases}$$

wherein the two threshold values $\alpha_{low\_thresh}$ and $\alpha_{high\_thresh}$ are selected in accordance to the average range of SFM values which are typically ranging from 0.2 to 0.8. The main purpose of the normalization stage is to ensure that the SFM impact factor regularly spans the complete region between "0" and "1". As such, the normalization ensures that a "normal" unflat spectrum (SFM<$\alpha_{low\_thresh}$) is not detected as noise and that the measure saturates for high values (SFM>$\alpha_{high\_thresh}$). In other words, the normalization provides an impact factor which more clearly distinguishes between high noise situations (SFM>$\alpha_{high\_thresh}$) and low noise situations (SFM<$\alpha_{low\_thresh}$).

WO PCT/EP2011/064084 describes techniques to conceal short intervals of mono reception of the FM receiver 1 by means of a reliable mono-detector in combination with a mechanism which uses previously estimated stereo parameters to generate a noise-reduced FM stereo signal during such mono time intervals. The techniques outlined in WO PCT/EP2011/064084 can also be applied to the prediction-based FM radio noise reduction system described in the present document.

As indicated above, the FM receiver 1 may toggle between stereo and mono due to time-variant bad reception conditions (e.g. "fading"). To maintain a stereo sound image during mono/stereo toggling, error concealment techniques may be used to conceal short mono dropouts. An approach to concealment in prediction-based FM radio noise reduction is to use prediction and decorrelation parameters a and b which are based on the previously estimated parameters in case that new parameters a and b cannot be computed because the audio output of the FM receiver 1 dropped down to mono. Thus, when the FM stereo receiver 1 switches to mono audio output, the prediction-based FM radio noise reduction system of FIG. 3 continues to use the previously estimated parameters a and b (individually for each frequency band). If the dropout periods in the stereo output are short enough so that the stereo sound image of the FM radio signal remains similar during a dropout period, the dropout is not audible or only scarcely audible in the audio output of the apparatus 2. Another approach may be to interpolate and/or extrapolate the parameters a and b from previously estimated parameters. In case, FM reception does not return to stereo quickly enough, the parameters a and b can slowly decay to approach zero after a few seconds, which means that just a mono signal (i.e. the mid signal) is output.

Alternatively or in addition, the prediction-based FM stereo noise reduction system may generate a "pseudo stereo" signal using default values to the parameters a and/or b in case that the reception conditions are so bad that only a mono signal is received. The default values may dependent upon a speech/music classification of the mid signal. In other words, the prediction-based FM stereo noise reduction system may comprise a classifier for classifying the type of received FM radio signal based on the received mid signal. By way of example, the classifier may be configured to classify the received FM radio signal as a speech signal or as a music signal (e.g. based on a frequency analysis of the received mid signal). The prediction-based FM stereo noise reduction system may then select appropriate values for the parameters a and/or b based on the determined type of the received FM radio signal. As such, a mono dropout of the received FM radio signal may be concealed using (type dependent) default parameters values.

The use of concealment within the prediction-based FM radio noise reduction system requires the reliable detection of mono dropouts, in order to trigger concealment, i.e. in order to set the concealment state $\delta_{conceal}$ from 0 to 1. A possible mono/stereo detector could be based on detecting mono sections of the signal which meet the condition left signal=right signal (or left signal−right signal=0). Such a mono/stereo detector would, however, lead to an instable behavior for the concealment process, due to the fact that the left signal and right signal energies, as well as the side signal energy, can fluctuate a lot even in healthy reception conditions.

Figure 6:
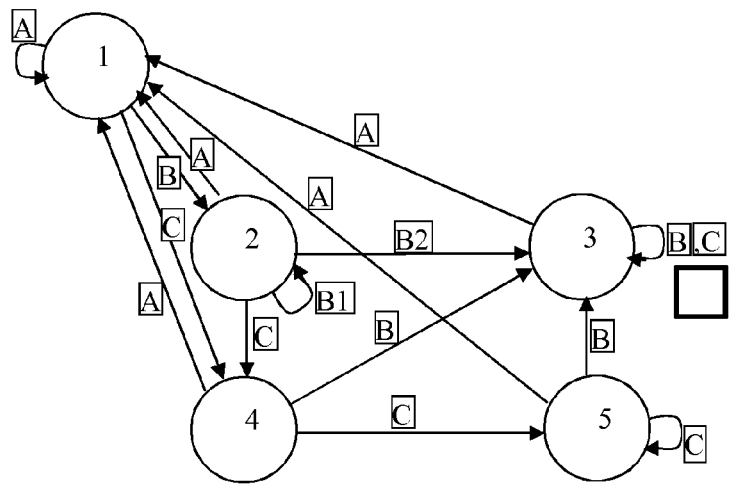
FIG. 6 shows an example state machine used for the concealment of the prediction and decorrelation parameters.

In order to avoid such instable behavior of the concealment, the mono/stereo detection and the concealment mechanism could be implemented as a state machine. An example state machine is illustrated in FIG. 6. The state machine of FIG. 6 makes use of two reference levels of the absolute energy of the side signal S, i.e. $E_S$ (or $P^S$ as defined above). The side signal S used to calculate $E_s$ may have been high pass filtered with a cutoff frequency of typically 250 Hz. These reference levels are an upper reference level ref_high and a lower reference level ref_low. Above the upper reference level (ref_high) the signal is considered to be stereo and below the lower reference levels (ref_low) it is considered to be mono.

The side signal energy $E_S$ is calculated as a control parameter of the state machine. $E_S$ may be calculated over a time window that could e.g. correspond to the time period of validity of the parameters a and b. In other words, the frequency of determining the side signal energy may be aligned to the frequency of determining the parameters a and b. In this document, the time period for determining the side signal energy $E_S$ (and possibly the parameters a and b) is referred to as a signal frame. The state machine of FIG. 6 comprises five conditions, which are verified each time the energy $E_S$ of a new frame is calculated:

Condition A indicates that the side signal energy $E_S$ exceeds the upper reference level ref_high. The upper reference level may be referred to as the higher threshold.

Condition B indicates that the side signal energy $E_S$ is lower than or equal to the upper reference level ref_high and higher than or equal to the lower reference level ref_low. The lower reference level may be referred to as the lower threshold.

Condition B1 corresponds to condition B, but adds an additional time condition. The time condition stipulates that condition B is met less than a threshold number of frames or less than a threshold time. This threshold may be referred to as the frame threshold.

Condition B2 corresponds to condition B, with the additional time condition stipulating that condition B is met more than or equal to the threshold number of frames or more than or equal to the threshold time.

Condition C indicates that the side signal energy $E_S$ is lower than the lower reference level ref_low.

Furthermore, the example state machine of FIG. 6 makes use of five states. The different states are reached subject to the above mentioned conditions and subject to the state diagram illustrated in FIG. 6. The following actions are typically performed in the different states within the prediction-based FM radio stereo noise reduction system:

In state 1 normal stereo operation is performed, e.g. based on the parameters a and b which are determined from the current audio signal. The concealment state $\delta_{conceal}$ remains at 0.

In state 2 normal stereo operation is performed based on the parameters a and b determined on the current audio signal. This state is only transitional, in view of the fact that either condition B is met for a number of frames more than or equal to the frame threshold or for a time more than or equal to the time threshold (i.e. condition B2) or prior to this lapse of number of frames or lapse of time, condition A or C is met. The concealment state $\delta_{conceal}$ remains at 0.

In state 3 stereo operation is performed based on the parameters a and b determined on the current audio signal. It can be seen that state 3 can be reached on a path going from state 1 via state 2 to state 3. In view of the fact that condition B2 requires a minimum number of frames or a minimum amount of time for the transition, the path "state 1, state 2, state 3" represents a slow, i.e. smooth, transition from a normal stereo operation (e.g. music) to a normal mono operation (e.g. speech). The concealment state $\delta_{conceal}$ is set to or remains at 0.

In state 4 mono dropout concealment is started using previously determined parameters a and b, e.g. the most recent parameters a and b which were determined in state 1. It can be seen that state 4 can be reached from state 1 directly, if condition C is met, i.e. if the side signal energy $E_S$ steeply drops from above ref_high to below ref_low. Alternatively, state 4 can be reached from state 1 via state 2, however, only if condition B is met for only a few number of frames or for only a short period of time. As such, the paths "state 1, state 4" and "state 1, state 2, state 4" represent a fast, i.e. abrupt, transition from a normal stereo operation (e.g. music) to a forced mono operation. The forced mono operation is typically due to the FM receiver which for example abruptly cuts off the side signal if the level or strength of the 19 kHz pilot tone in the stereo multiplex signal falls below a pre-determined level, thus making reliable demodulation of the side signal from the received stereo multiplex signal impossible. The concealment state $\delta_{conceal}$ is set to 1, in order to indicate the use of concealment within the prediction-based FM radio noise reduction system.

In state 5 mono dropout concealment is continued e.g. based on the parameters a and b which have been established in state 4. In the illustrated embodiment, state 5 can only be reached from state 4 if condition C is met, i.e. state 5 represents the stable mono dropout concealment state, where previously determined parameters a and b are used in order to generate a noise-reduced side signal from the received mid signal. The parameters a and b may decay to zero with a time constant of a few seconds, resulting in an output signal that slowly transitions from stereo to mono. The concealment state $\delta_{conceal}$ typically remains at 1.

As already indicated, the illustrated state diagram ensures that concealment is triggered only if the audio signal received by the FM receiver goes from stereo to mono within a few time windows/frames, i.e. if the transition from stereo to mono is abrupt. On the other hand, trigging of concealment is prevented in cases where there is noise in the side signal with energy $E_S$ below stereo level (ref_high) but above mono level (ref_low), i.e. in cases where there is still sufficient information within the side signal to generate appropriate parameters a and b. At the same time, even when the signal changes from stereo to mono, e.g. when the signal transits from music to speech, the concealment detection will not be triggered, thereby ensuring that the original mono signal is not rendered into an artificial stereo signal due to the erroneous application of concealment. An authentic transition from stereo to mono can be detected based on a smooth transition of the side signal energy $E_S$ from above ref_high to below ref_low.

In the present document, a method and system for improving the perceptual performance of FM radio receivers have been described. In particular, a method and system for determining a noise-reduced FM stereo signal using a prediction-based approach have been described. By using a prediction-based FM radio noise reduction system, the computational complexity for noise reduction can be reduced compared to a PS-based FM radio noise reduction system. Furthermore, various methods for improving the performance of the prediction-based FM radio noise reduction system have been described. In particular, the use of a quality indicator has been described to blend between the noise-reduced side signal and the original side signal. Furthermore, a method for adapting parameters of the prediction-based FM radio noise reduction system to the spectral characteristics of the received side signal has been described, thereby reliably distinguishing between noisy and good reception conditions. In addition, a concealment method has been described in order to adapt the prediction-based FM radio noise reduction system to mono dropout situations.

The methods and systems described in the present document may be implemented as software, firmware and/or hardware. Certain components may e.g. be implemented as software running on a digital signal processor or microprocessor. Other components may e.g. be implemented as hardware and or as application specific integrated circuits. The signals encountered in the described methods and systems may be stored on media such as random access memory or optical storage media. They may be transferred via networks, such as radio networks, satellite networks, wireless networks or wireline networks, e.g. the internet. Typical devices making use of the methods and systems described in the present document are portable electronic devices or other consumer equipment which are used to store and/or render audio signals.

The invention claimed is:

1. An apparatus configured to reduce noise of a received multi-channel FM radio signal; wherein the received multi-channel FM radio signal is representable as a received mid signal and a received side signal; wherein the received side signal is indicative of a difference between a left signal and a right signal of the received multi-channel FM radio signal; the apparatus comprising a parameter determination unit configured to determine one or more parameters indicative of a correlation and/or decorrelation between the received mid signal and the received side signal; wherein the parameter determination unit is configured to determine a decorrelation parameter b indicative of a decorrelation between the received mid signal and the received side signal; and a noise reduction unit configured to generate a noise-reduced side signal from the received mid signal using the one or more parameters; wherein the noise reduction unit is configured to generate the noise-reduced side signal also from a decorrelated version of the received mid signal using the decorrelation parameter b; wherein the received side signal is not in a signal path for the generation of the noise-reduced side signal.

2. The apparatus of claim 1, wherein the parameter determination unit is configured to determine a prediction parameter a indicative of a cross-correlation between the received mid signal and the received side signal; and the noise reduction unit is configured to generate the noise-reduced side signal from the received mid signal using the prediction parameter a.

3. The apparatus of claim 2, wherein the parameter determination unit is configured to determine the prediction parameter a based on an expectation value of a product of corresponding samples of the received mid signal and the received side signal.

4. The apparatus of claim 3, wherein the parameter determination unit is configured to determine the prediction parameter a as $$a = E[S*M]/E[M*M],$$

wherein E[•] denotes the expectation operator, S is the received side signal and M is the received mid signal.

5. The apparatus of claim 4, wherein the parameter determination unit is configured to determine the decorrelation parameter b based on the energy of a difference signal of the received side signal and a signal determined from the mid signal using the prediction parameter a.

6. The apparatus of claim 5, wherein the parameter determination unit is configured to determine the decorrelation parameter b as $$b = \mathrm{sqrt}(E[D*D]/E[M*M])$$

with D=S−a*M being the difference signal.

7. The apparatus of claim 6, wherein the noise reduction unit is configured to generate the decorrelated version of the received mid signal by filtering the received mid signal using an all-pass filter.

8. The apparatus of claim 7, wherein
the parameter determination unit is configured to determine an impact factor characteristic of the spectral flatness of the received side signal; and
the decorrelation parameter b is dependent on the impact factor.

9. The apparatus of claim 8, wherein the decorrelation parameter b decreases as the impact factor indicates an increasing degree of spectral flatness of the received side signal.

10. The apparatus of claim 1, wherein
the parameter determination unit is configured to determine the one or more parameters in a time variant manner; and
the noise reduction unit is configured to generate the noise-reduced side signal using the one or more time variant parameters.

11. The apparatus of claim 10, wherein
the parameter determination unit is configured to determine, for a first of the one or more parameters, a sequence of first parameters for a corresponding sequence of time intervals; and
a particular first parameter of the sequence of first parameters for a particular time interval of the sequence of time intervals is determined using samples of the received mid signal and/or the received side signal which lie within the particular time interval.

12. The apparatus of claim 11, wherein the parameter determination unit is configured to determine a sequence of interpolated first parameters by interpolating adjacent first parameters from the sequence of first parameters.

13. The apparatus of claim 12, configured to detect that the received multi-channel FM radio signal is a forced mono signal by
determining an energy of the received side signal within a first time interval of the sequence of time intervals; wherein the energy is above a high threshold;
determining a transition period of a number of following successive time intervals during which the energy of the side signal drops from a value above the high threshold to a value below a low threshold; and
determining that the received multi-channel FM radio signal following the first time interval is a forced mono signal if the number of successive time intervals of the transition period is below an interval threshold.

14. The apparatus of claim 13, wherein if it is detected that the received multi-channel FM radio signal in a time interval following the first time interval is a forced mono signal, the parameter determination unit is configured to determine the one or more parameters for the time interval following the first time interval from the one or more parameters for the first time interval.

15. The apparatus of claim 1, wherein
the parameter determination unit is configured to determine the one or more parameters in a frequency variant manner; and
the noise reduction unit is configured to generate the noise-reduced side signal using the one or more frequency variant parameters.

16. The apparatus of claim 15, further comprising
a mid transform unit configured to generate a plurality of mid subband signals covering a corresponding plurality of frequency ranges from the received mid signal; and
a side transform unit configured to generate a plurality of side subband signals covering the corresponding plurality of frequency ranges from the received side signal; and
wherein the parameter determination unit is configured to determine, for a second of the one or more parameters, a plurality of second subband parameters from the corresponding plurality of mid subband signals and the corresponding plurality of side subband signals.

17. The apparatus of claim 16, wherein the side transform unit meets lower requirements than the mid transform unit with regards to at least one of:
frequency selectivity;
frequency resolution;
time resolution; and
numerical accuracy.

18. The apparatus of claim 17, wherein
the noise reduction unit is configured to generate a plurality of noise-reduced side subband signals from the corresponding plurality of mid subband signals and the corresponding plurality of second subband parameters; and
the noise reduction unit comprises an inverse transform unit configured to generate the noise-reduced side signal from the plurality of noise-reduced side subband signals.

19. The apparatus of claim 18, wherein the mid transform unit and/or the side transform unit are QMF filter banks.

20. The apparatus of claim 1, wherein the parameter determination unit is configured to limit the one or more parameters by applying to the one or more parameters a limitation factor c.

21. The apparatus of claim 20, wherein, for c >1, the limitation factor c is proportional to the sum of the one or more squared parameters.

22. The apparatus of claim 20, wherein, for c >1, the limitation factor c is proportional to the square root of the sum of the one or more squared parameters.

23. The apparatus of claim 22, wherein the application of the limitation factor c does not increase the one or more parameters.

24. The apparatus of claim 1, comprising
a delay unit configured to delay a sample of the received mid signal by an amount of time corresponding to computation time required to generate a corresponding sample of the noise-reduced side signal.

25. The apparatus of claim 1, comprising a combining unit configured to determine a modified noise-reduced side signal from the noise-reduced side signal and the received side signal using a quality indicator indicative of the quality of the received multi-channel FM radio signal.

26. The apparatus of claim 25, wherein the combining unit comprises
a noise-reduced gain unit configured to weight the noise-reduced side signal using a noise-reduced gain;
a bypass gain unit configured to weight the received side signal using a bypass gain; and
a merging unit configured to merge the weighted noise-reduced side signal and the weighted received side signal; wherein the noise-reduced gain and the bypass gain are dependent on the quality indicator.

27. The apparatus of claim 26, wherein the combining unit is configured to determine the modified noise-reduced side signal in a frequency selective manner.

28. The apparatus of claim 27, comprises a quality determination unit configured to determine the quality indicator by determining a power of the received mid signal, referred to as mid power, and a power of the received side signal, referred to as side power;

determining a ratio of the mid power and the side power, thereby yielding a mid-to-side ratio; and determining the quality indicator of the received FM radio signal based on at least the mid-to-side ratio.

29. The apparatus of claim 1, comprising an MS-to-LR converter configured to determine a noise-reduced left signal and a noise-reduced right signal from the received mid signal and the noise-reduced side signal.

30. The apparatus of claim 29, wherein the MS-to-LR converter is configured to determine the noise-reduced left signal from the sum of the received mid signal and the noise-reduced side signal; and the noise-reduced right signal from the difference of the received mid signal and the noise-reduced side signal.

31. A method for reducing noise of a received multi-channel FM radio signal; wherein the received multi-channel FM radio signal is presentable as a received mid signal and a received side signal; the method comprising determining one or more parameters indicative of a correlation and/or decorrelation between the received mid signal and the received side signal; wherein the one or more parameters comprise a decorrelation parameter b indicative of a decorrelation between the received mid signal and the received side signal; and generating a noise-reduced side signal from the received mid signal using the one or more parameters, wherein generating the noise-reduced side signal comprises generating the noise-reduced side signal also from a decorrelated version of the received mid signal using the decorrelation parameter b; wherein the received side signal is not in a signal path for generating the noise-reduced side signal.

32. A non-transitory computer readable storage medium comprising instructions adapted for execution on a processor and for performing the method steps of claim 31 when carried out on a computing device.

* * * * *